R. H. SMITH.
NUT CROWNING MACHINE.
APPLICATION FILED AUG. 4, 1910.

1,113,702.

Patented Oct. 13, 1914.
5 SHEETS—SHEET 5.

Witnesses:
E. B. Gilchrist
H. R. Sullivan

Inventor
Roy H. Smith
by Thurston & Kwis
Attys

UNITED STATES PATENT OFFICE.

ROY H. SMITH, OF CLEVELAND, OHIO.

NUT-CROWNING MACHINE.

1,113,702. Specification of Letters Patent. Patented Oct. 13, 1914.

Application filed August 4, 1910. Serial No. 575,468.

*To all whom it may concern:*

Be it known that I, ROY H. SMITH, a citizen of the United States, residing at Cleveland, in the county of Cuyahoga and State of Ohio, have invented a certain new and useful Improvement in Nut-Crowning Machines, of which the following is a full, clear, and exact description.

This invention relates to a machine for crowning the head of nuts.

The machines at present in use, so far as I am aware, operate upon the principle of threading a nut upon a revolving mandrel, then presenting the nut to the cutting tool, and finally removing the nut from the mandrel by rotating the mandrel in the opposite direction to that in which it was originally turning. In such machines the nuts are operated upon one at a time, and therefore, it is clear that the process involved in the use of such machines is extremely tedious and wasteful of time.

The machine, which is here shown and described, receives the nut blanks through a suitable feeding mechanism, crowns the face of the nut, and discharges the same through a suitable discharging mechanism without stopping or reversing the machine in any manner; thereby making the process continuous. The only attendance required is to supply nuts to the feeding mechanism and to remove them after they are discharged from the machine.

Generally speaking, the invention comprises the elements and combinations thereof set forth in the accompanying claims.

Reference should be had to the accompanying drawings, forming a part of this specification, in which—

Generally speaking, the machine comprises an intermittently rotatable head in which are journaled a number of spindles which continuously revolve. Upon these spindles are carried the threaded nut blanks, and each blank is successively presented to two cutters, the first for preliminarily crowning and the second for finishing the face of the nut. Of course, it will be apparent that a single cutter might be used, if desired; or more than two cutters may be used. The nuts are fed onto the spindles by peculiar mechanism which will later be described, and are likewise removed from a spindle, after having been subjected to the cutters, by another mechanism which will later be described. As before stated, the head carrying the rotating spindles is itself rotated intermittently for the purpose of permitting the blanks to be operated on successively.

The mechanism for removing the finished nut from the spindle, as well as a portion of the feeding device by which the nut blanks are presented to the rotating spindle and the cutters, are all carried upon a sliding head which is moved under the influence of a cam.

The nuts or blanks upon which the machine operates are first provided with a threaded center opening and the rear face of the nut is trimmed to make it true with the threads. The front face of the nut is previously untreated.

Figure 1:
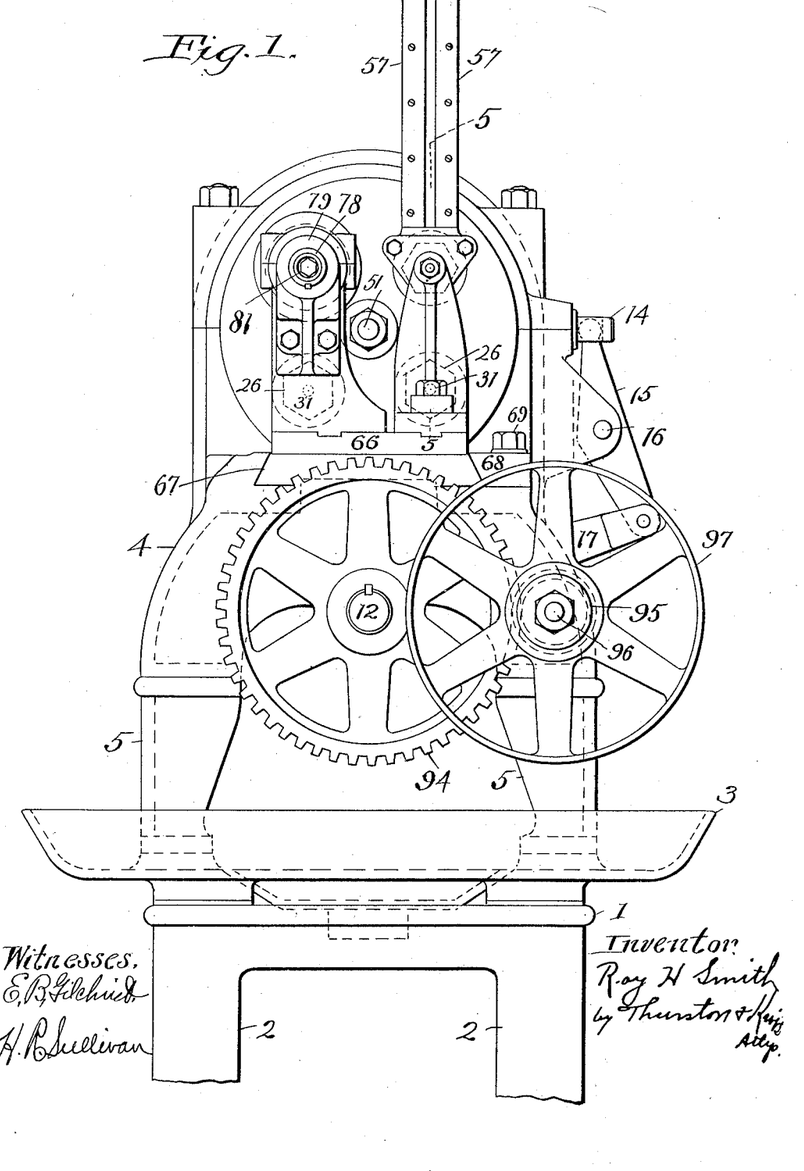
Figure 1 is an end elevation of the machine.

Referring to Fig. 1, a support 1 is shown having legs 2, which legs are duplicated at the opposite end of the support not shown. The upper end of the support 1 is formed as a broad trough-shaped member 3, for the purpose of retaining the fluid which is supplied to the cutters during their operation.

Mounted upon the bottom of the member 3 is the machine forming the subject matter of this invention, which comprises a frame having a bed 4 supported upon suitable legs 5 at the opposite ends of the bed. At one end of the bed is a stationary head 6, which may be formed integral with the bed, if desired. This head forms a journal for a rotating head 7, the same being secured within the head 6 in any desired manner.

Figure 6:
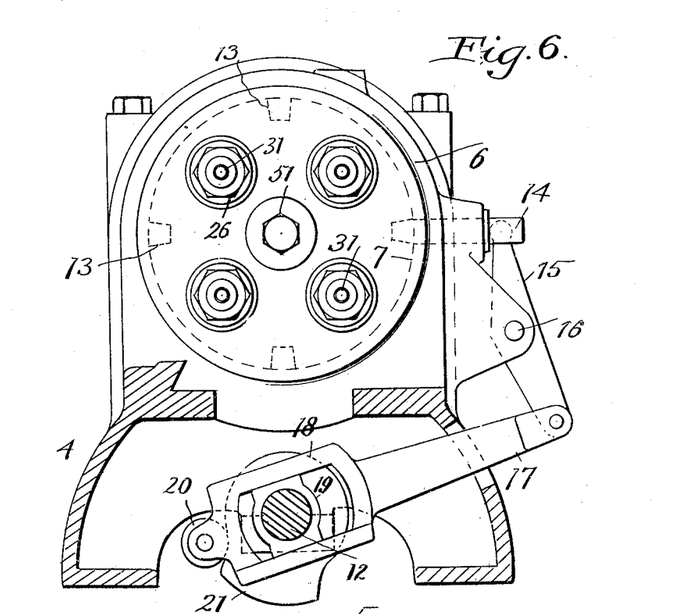
Fig. 6 is a section on the line 6—6 of Fig. 2 looking in the direction indicated by arrows.
Figure 7:
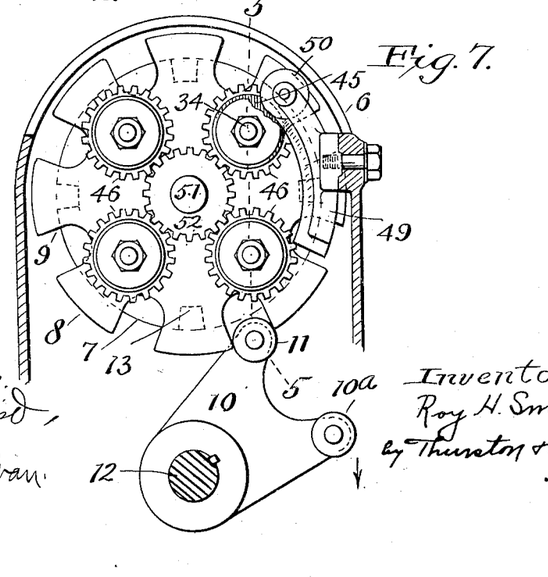
Fig. 7 is a section upon the line 7—7 of Fig. 2 looking in the direction of the arrows.

Upon the outer end of the head 7 is an indexing plate 8, which, as shown in Fig. 7, comprises a plate having a plurality of U-shaped indentations 9 which are symmetrically arranged around the plate. Coöperating with the indexing plate 8 is an arm 10 which is provided with projecting portions carrying rollers 10ª and 11, which rollers are adapted to successively engage in the opening 9. The arm 10 is secured in any suitable manner upon the shaft 12, which is journaled in the lower part of the bed 4 and extends substantially throughout the length thereof. It will be apparent that as the arm 10 is rotated in the direction indicated by the arrow in Fig. 7 the rollers 10ª and 11 will successively engage with adjacent openings 9 in the plate, thereby causing the rotation of the same, which will in turn cause the head 7 to rotate. The arrangements of the parts is such that the successive engagement of the rollers 10ª and 11 with the adjacent openings 9 will cause the rotation of the head to an angle of ninety degrees, or a quarter of a revolution. For the purpose of accurately positioning the head and preventing the same from turning more than a quarter of a revolution at each successive indexing, I provide the stop mechanism which is illustrated more particularly in Fig. 6.

The head 7 near the forward end thereof is provided with a plurality of depressions indicated at 13. These indentations are spaced from each other through angles of ninety degrees. A pin 14 is mounted upon the exterior of the stationary head 6, and projects through the same so that when one of the openings 13 is opposite the place in the casing 6 through which the pin projects, the pin will be projected into the depression and retain the head 7 against further rotation.

The pin coöperates with and is moved by a lever 15 which is pivoted at 16 upon a projecting lug carried by the casing 6. At its lower end the lever 15 is pivoted upon a lever 17 which, at its inner end, is provided with a yoke 18 which engages with a block 19 mounted upon the shaft 12. The block 19 and yoke 18 are suitably held in operative relation with each other in any desired manner, and the yoke 18 freely reciprocates upon the block 19. The block 19 is merely mounted upon the shaft for convenience, and is not secured thereto. Upon the end of the yoke 18 is a friction roller 20, which coöperates with a cam 21 fixedly mounted upon the shaft 12. This cam is suitably mounted and arranged upon the shaft to withdraw the pin 14 at proper intervals and permit it to again project into a suitable opening 13, when the head has been properly indexed.

As described, the indexing is through an angle of ninety degrees. However, if a greater or less number of rotating spindles be employed, the indexing would be changed, but the mechanism described is entirely capable of modification to meet such a requirement without changing the fundamental construction employed.

Within the rotatable head 7 are journaled a plurality of spindles, generally represented at 22,—four in number, as shown, although more or less might be used where necessity occasioned. The construction of these spindles is more clearly indicated in Fig. 5, and comprises a tubular portion 23 which is supported at one end in a thimble 24 which projects a suitable distance into the opening in the head 7. This thimble is formed of suitable bearing material and is provided with a head against which the adjacent gear abuts, as will later be described.

Figure 5:
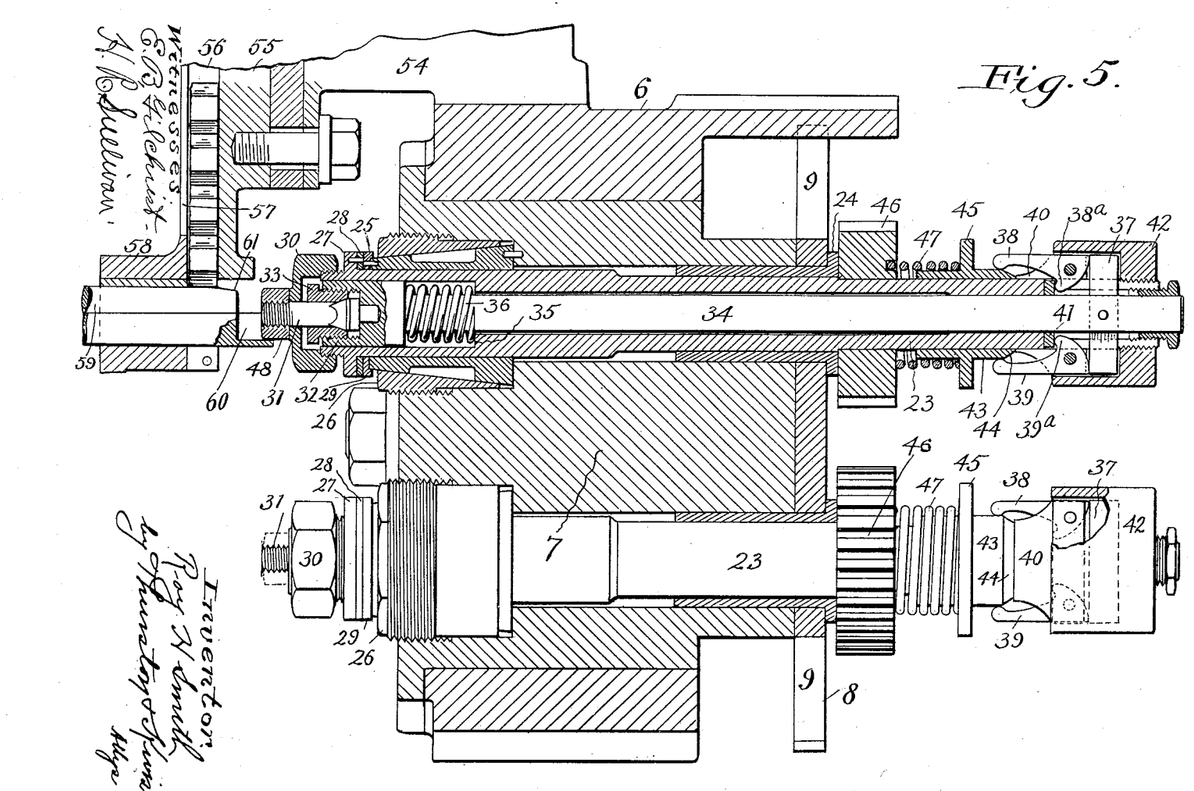
Fig. 5 is a section upon the line 5—5 of Fig. 7 with certain portions omitted.

At the forward end the spindle coöperates with a wedge-shaped member 25 which is formed of suitable bearing material, and this member is in turn held in place by means of a bushing 26 carried by the head, which bushing is tapered in a manner to be complementary to the member 25, and is screw-threaded upon its outer surface for the purpose of engaging with screw threads formed upon a suitable opening in the head 7 to receive the same. The tubular member 23 is provided with a flange 27 at its forward end, to which is secured a wearing ring 28, and this wearing ring bears against a similar wearing ring 29, which is suitably secured upon the member 25.

It will be apparent that the position of the bushing 26 will regulate the amount of play or looseness of the tubular member 23 within its bearings. At the forward end of the tubular member 23 and in front of the flange 27 the outer portion is screw threaded, and this screw threaded portion coöperates with a head 30 which is internally recessed to provide a chamber and the inner wall of the chamber is screw-threaded. This head is provided with a central opening through which extends a stud 31 which is screw threaded upon its end for the purpose of engaging with the threaded opening within the nut blank, as will later be described.

The stud 31 is held within a head 32 which is recessed and threaded upon its inner walls to coöperate with a nut 33 having a central opening through which the stud 31 extends. The head 32 is carried upon a rod 34 to which it is fixedly secured or made integral therewith.

The tubular member 23 is provided with a shoulder indicated at 35 which coöperates with a spring 36 which surrounds the rod 34 and presses against the head 32, thus insuring that at all times the rod 34 shall occupy its foremost position, unless otherwise retained. At the opposite end to that just under discussion the rod 34 is provided with a cross member 37, against which abut the heads of fingers 38 and 39, which are pivoted upon a thimble 40 secured upon the tubular member 23. The fingers 38 and 39 are provided with noses, as indicated at 38ª and 39ª, which abut against a wear plate 41 carried by the tubular shaft 23.

The noses of the fingers 38 and 39 operate through slots in the shaft 23 and at the rear of the shaft 23 a hollow member 42 is secured which forms a housing for the head portions of the fingers and the cross member 37 just mentioned. It will be apparent that as the fingers 38 and 39 move upon their pivots and the noses of the fingers bear against the plate 41 and the heads of the fingers bear against the cross member 37 it will cause a relative movement between the rod 34 and the tubular member 23, which is made use of in a manner which will be presently described.

Surrounding the tubular member 23 is a sleeve 43, the finished end of which is beveled as indicated at 44, and coöperates with the free ends of the fingers 38 and 39. This sleeve is provided with an annular flange, near the middle portion thereof, as indicated at 45, which coöperates with a cam in a manner later set forth. Upon each tubular member 23 is a gear 46 which is fast upon the tubular shaft. Between the gear 46 and the flange 45 is a spring 47 which is continually tending to push the sleeve 43 so that the arms upon the fingers 38 and 39 are raised.

It will be noted from the construction, as before stated, that with the parts in the position shown in Fig. 5 the fingers 38 and 39 are tending to produce a relative movement between the tubular member 23 and the rod 34. That is, they are tending to pull the rod 34 against the action of the spring 36 which normally tends to urge the rod 34 out. It will be apparent that under the action of the spring 36 any given nut blank, such as represented at 48 in Fig. 5, will be tightly held against the nut 30 and when presented to the cutter will not readily rotate upon the stud 31.

Figure 2:
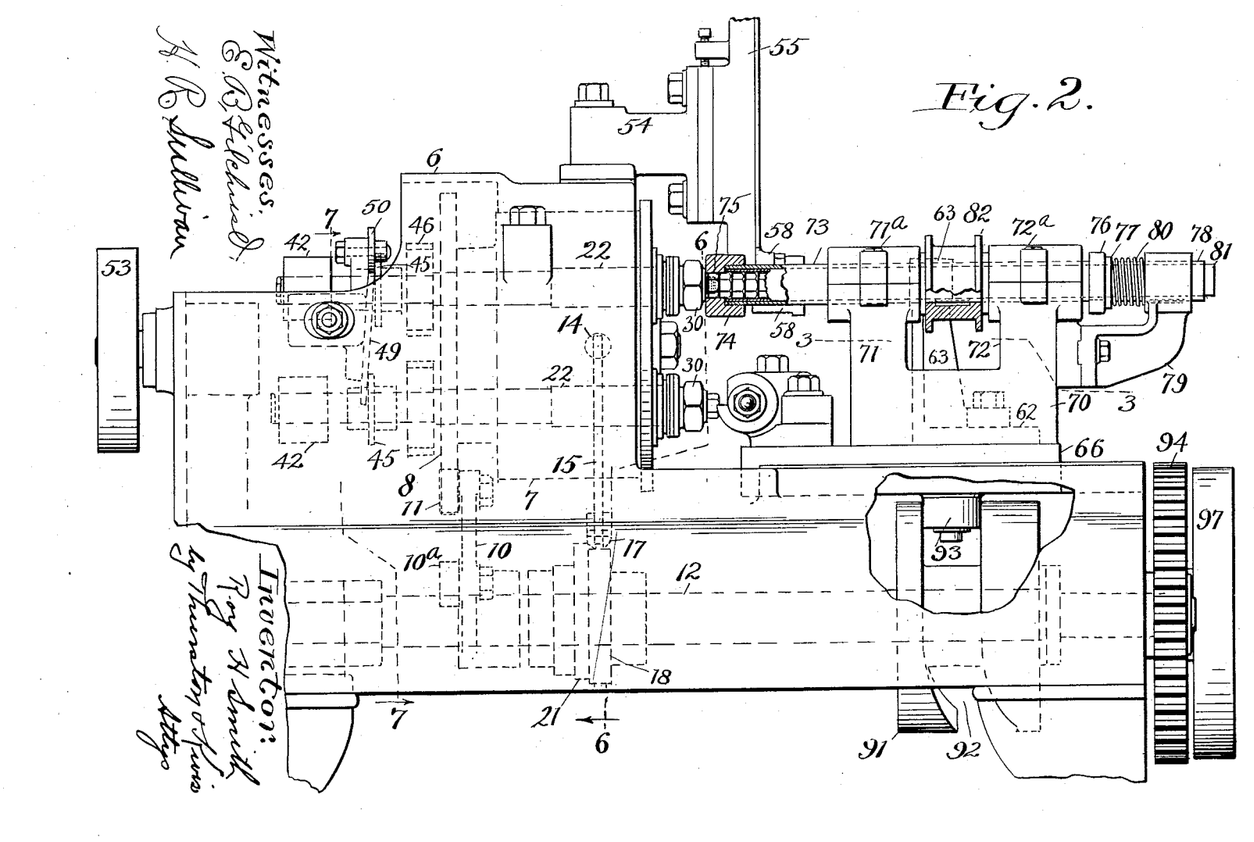
Fig. 2 is a front elevation of the machine.
Figure 3:
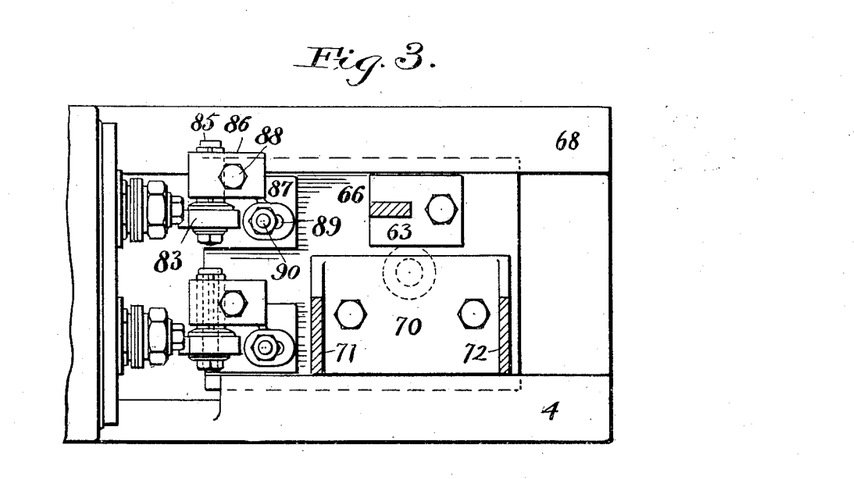
Fig. 3 is a section upon the line 3—3 of Fig. 2.
Figure 4:
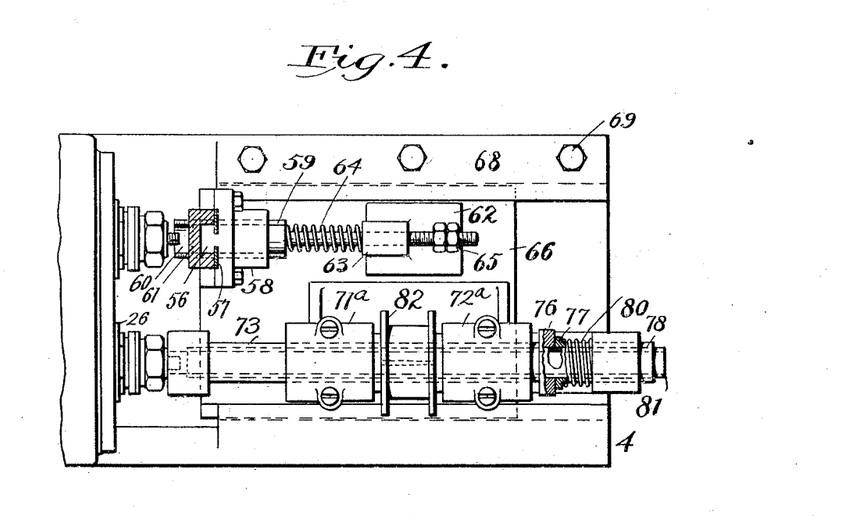
Fig. 4 is a top plan view of the right end portion of the machine, as shown in Fig. 2.

By referring to Fig. 7, it will be seen that there is mounted upon the stationary casing 6 a member 49, and this member is held upon the casing in a slanting manner, as indicated at the left hand portion of Fig. 2, so that as the head 7 rotates the member 49 will engage with the flange 45 upon the particular spindle which is adjacent thereto, and will cause the thimble 43 upon this spindle to move toward its gear 46, thereby allowing the arms of the fingers 38 and 39 to move toward the axis of the spindle, which in turn permits the spring 36 to further act and projects the rod 34 forward, which in turn causes the stud 31 to project slightly forward, moving the nut blank out of contact with the head 30, thereby allowing the nut carried upon the stud to be freely turned. This action takes place at the time when the mechanism for removing the nuts from the spindles and discharging the same is in operation. Upon the upper end of the member 49 at the point where occurs the greatest friction between this member and the flange 45 with which it comes in engagement, a wheel 50 is mounted, for the purpose of reducing the friction at this point.

Through the central portion of the rotatable head 7 a shaft 51 extends, the same being journaled within the member 7 but free to turn with respect to it. This shaft carries a gear wheel 52 which is secured thereto, which gear wheel is of proper size to mesh with the gear wheels 46 carried by the spindles 22, so that all the gears and spindles may be rotated by the operation of the shaft 51. This shaft 51 is rotated by means of a pulley 53 which may be turned by suitably belting the same with the line shaft. It will be apparent that the operation just described, namely, projecting the stud 31 beyond the head 30, may be accomplished while the spindle is rotating.

Mounted upon the stationary head 6 is a forwardly projecting arm 54 provided with a face, to which is bolted a hopper, comprising a member 55, which is provided with a slot 56, in the frone face thereof. This slot is of proper width to accommodate nuts of the size for which the machine is designed. Upon the side walls of the member 55, bordering the slot 56, are secured plates shown at 57 in Fig. 1, the same being held in place in any suitable manner. These plates are spaced apart at their adjacent edges so that the passage of the nuts through the slot 56 may be easily observed.

At the lower end the member 55 is provided with a projecting portion 58 having an opening through which extends a reciprocating rod 59. This rod at the forward portion is provided with a semi-circular recess 60 which may be formed directly in the rod itself, or, as here shown, is formed by securing a semi-circular member, as a piece of pipe cut through its longitudinal axis, upon the forward end of the rod 59. As the rod 59 reciprocates, the portion 60, at certain times, will be beneath the slot 56 and at such time will receive a nut blank. As the rod 59 moves toward the spindle, the rod itself will close the slot 56 and prevent the pasage of the nut blanks. At the same time the blank which is held within the portion 60, will be presented to the spindle to which it is opposite, and, due to the rotation of the spindle through the media of the shaft 51, the nut will be threaded upon the stud 31.

For the purpose of providing an easy engagement between the rod 59 and the nut blanks the forward end of the rod 59 is chamfered, as indicated at 61. The rod 59 is supported at the end opposite to that just discussed, upon a bracket 62 which is provided with an upwardly extending arm upon which is secured a journal box 63.

Surrounding a reduced portion of the rod 59 is a spring 64 which abuts at one end against the end of the rod 59 and at the opposite end against the bracket 62. Upon the portion of the rod 59 which extends beyond the bracket 63 the surface is screw threaded, and there are nuts 65 threaded upon the same which may be adjusted to regulate the amount of movement of the rod 59.

The spring 64 is provided for the purpose of permitting a certain amount of longitudinal movement of the shaft 59, with respect to the bracket 62, so that the shaft may yield and be pushed back by the moving parts, in the event that such extra movement is necessary, and thereby prevent the breaking of the machine.

The bracket 62 is mounted upon a bed plate 66 which reciprocates upon the bed 4 of the machine, and is guided in its reciprocation through an undercut way formed in the bed plate, as indicated at 67 in Fig. 1. The sides of the bed plate 66 are correspondingly beveled to engage with the undercut portions of the slot formed in the bed plate. For convenience in assembling a removable portion 68 is provided, which forms one side for the slot, and this is held upon the bed plate in any suitable manner, as by means of nuts indicated at 69.

Upon the bed plate 66 is secured a second bracket 70, which is provided with a pair of upwardly extended arms 71 and 72, which arms at their upper extremities are provided with journal boxes 71$^a$ and 72$^a$. Within these journal boxes rotates a hollow shaft 73 which, at its forward end, is provided with a head 74 secured thereto, or integrally formed therewith. This head has a central opening, indicated at 75, which is of proper size and shape to engage with such a nut as the machine is handling.

At a point beyond the journal box 72 the shaft 73 is provided with a collar 76 and abutting against this collar is the flange 77 carried by a second hollow shaft 78. This hollow shaft 78 is journaled in a bracket 79 which is bolted or otherwise secured, to the bracket 70. A spring 80 surrounds the hollow shaft 78 and at its opposite ends abuts against collar 77 and the portion of the bracket 79 within which the shaft 78 is journaled. A tube 81 extends through the hollow shafts 78 and 73, and coöperates with a shoulder formed in the head 74. The internal diameter of the tube 81 is substantially the same as the greatest diameter of the opening 75, so that the nuts may readily pass from the opening 75 into the tube 81. The spring 80 is provided for the purpose of permitting a certain amount of movement of the shaft 73 in the longitudinal direction so that the shaft may yield in the event that such yielding is necessary, and thereby obviate a breakage in the machine.

The shaft 73 is provided with a pulley 82 which is secured to the shaft between the journal boxes 71$^a$ and 72$^a$. This pulley is connected with the line shafting, and is so belted that it rotates at a greater speed than do the individual spindles 22. Consequently when the opening within the head 74 engages with a finished nut blank the nut will be screwed off the stud 31 by which it was carried, due to the fact that the head 74 is rotating at greater speed than the stud itself. As the successive nuts are removed from the spindles, they pass through the hollow tube 81 and are discharged through the rear end of this tube into a suitable receptacle.

The reciprocating plate 66 carries two cutters which simultaneously operate upon two nut blanks. These cutters are generally represented at 83 and 84, the cutter 83 being used for a preliminary cutting, and the cutter 84 for the finish cutter. These cutters are of a well known type and need not be further described.

A description of the mounting of the cutter 83 will suffice for both cutters, inasmuch as their mounting is the same. The cutter 83 is mounted upon a stub shaft 85 which is clamped between the plate 86 and the plate 87 and held in place in any suitable manner as by means of the bolt 88. The plate 87 is adjustable upon the plate 66, the first mentioned plate being provided with a slot 89 through which extends a bolt 90 which engages with a suitable opening in the plate 66.

The plate 66 is reciprocated toward and from the rotating head by means of a cam 91 which is secured upon the shaft 12. This cam is provided with a groove 92 in which travels a roller 93 which is secured to the under side of the plate 66. The groove 92 is so formed and the cam is arranged upon the shaft 12 in such a manner that the plate 66 will make its forward excursion toward the rotating spindles immediately after the indexing of the revolving head 7 occurs, and will make its rearward excursion during the period in which the head 7 is indexing.

The shaft 12 has a gear 94 secured thereto at the outer end beyond the base of the machine, and this gear meshes with a smaller gear 95 carried upon a shaft 96 which is supported by the base 4 of the machine. This shaft 96 likewise has secured thereto a pulley 97 which is belted in a suitable manner to the line shafting.

The operation of the machine will be quite obvious from the foregoing discussion. Nevertheless it is deemed advisable to set forth its operation at this time.

The blanks are fed by hand into the top of the member 55 and pass through the slot 56 therein. The line shafting now being put in operation, the pulleys 53, 82 and 97 are set in operation. The rotation of the pulley 53 will cause the shaft 51 to rotate, which, in turn, will cause the rotation of the gears 46 which are carried by the various spindles 22, and thereby the before mentioned spindles will rotate. The rotation of the pulley 97 will cause the plate 66 to make a forward excursion, during which time the rod 59 will feed a nut blank from the bottom of the slot 56 toward the stud 31 which is opposite the rod 59, and inasmuch as the stud is rotating the nut will be threaded upon the stud. The cam 91 will have revolved sufficiently so that the plate 66 will make its rearward excursion, and during this time the stop pin 14 will be withdrawn, due to the rotation of the shaft 12, which operates the cam 21 and, through the roller 20 and levers 17 and 16, moves the stop pin. Simultaneously the arm 9 upon the shaft 12 will cause the rollers 10 and 11 to successively engage in adjacent slots 9 in the indexing plate 8, and will turn the indexing plate and the head 7 to which it is secured through an angle of ninety degrees, whereupon the stop pin 14 will enter the succeeding opening 13 in the head and hold the head 7 against further rotation. By this time the plate 66 will again be making a forward excursion and a new nut blank will be threaded upon the stud 31 of the spindle which is opposite the rod 59, and the nut which has been fed upon the stud of the spindle which was previously opposite the rod 59 will now be presented to the cutter 83, and inasmuch as the spindle is rotating, thereby rotating the blank, the face of the nut blank which is toward the cutter will be partially crowned. At the proper time the pin 14 will again be withdrawn and the head 7 will be again rotated through an angle of ninety degrees and concurrently with this the head 66 will make another complete excursion, whereupon the nut blank fed upon the first spindle mentioned will be presented to the cutter 84 for its finishing, while the nut blank second mentioned will be presented to the cutter 83 for its preliminary cutting, and a new nut blank will be fed upon the stud carried by the third spindle.

With the next indexing of the head 7 and the concurrent complete excursion of the plate 66, the first mentioned nut blank will be opposite the shaft 73, and upon the complete forward excursion of the plate 66 which carries the shaft 73, the nut blank will extend within the opening 75 of the head 74 carried by the shaft 73. Inasmuch, as has previously been explained, the shaft 73 is rotating at a greater speed than the spindles 22, and in the same direction, the nut blank will be screwed off the stud upon which it has previously been carried, and will remain in the head 74. However, simultaneously with this operation, the thimble 43 will have been moved toward the gear 46 by reason of the engagement of the flange 45 upon the thimble 43 with the cam member 49. As previously explained, this operation will cause the stud carried by the spindle to be pushed forward slightly to release the nut blank from contact with the head 30 of the spindle, and thus permit the head 74 upon the revolving shaft 73 to more readily remove the nut from the stud 31.

The nut blank second mentioned will simultaneously be presented to the cutter 84 for its finishing trim, while the nut blank third mentioned will be operated upon by the cutter 83 to receive its preliminary trimming, and a new nut blank will be fed upon the fourth spindle. The spindle from which the nut blank has just been removed will, upon the next indexing of the head 7, be again opposite the rod 59, and will receive a new nut blank which will in turn undergo the various operations described.

From the foregoing description, it will be clear that the machine here shown and described is entirely automatic and continuous and the only attention necessary for successful operation of the machine is the continuous feeding of nut blanks into the slot 56 and the removal of nut blanks which are discharged from the end of the tube 81.

It will be apparent that various modifications may be made in the details of the machine without departing from the spirit of the invention, and I therefore do no limit myself to the details here shown, except in so far as specifically mentioned in the claims.

Having described my invention, I claim:

1. In a nut crowning machine, the combination with a plurality of rotating spindles, of means for automatically feeding a nut from a single blank holder upon each of the spindles successively, means for crowning a face of the nut, and means for successively removing the nuts from the spindles.

2. In a nut crowning machine, the combination with a plurality of rotating spindles, of means for presenting a nut blank in position to be engaged by a spindle, and means for successively bringing each spindle and the nut presenting means into operative relationship, means for successively crowning the faces of the nuts, and means for successively removing the nuts from the spindles after crowning.

3. In a nut crowning machine, the combination of a head, means for periodically rotating said head a predetermined distance, a plurality of rotating spindles carried by the said head, means for successively feeding the nuts upon said spindles, means for successively crowning one face of the nuts, and means for successively removing the nuts from the spindles and discharging the same.

4. In a nut crowning machine, the combination of a head, means for indexing said head, a plurality of rotating spindles carried by the said head, each spindle being provided with a threaded end portion, means for presenting a nut having a threaded opening to the spindles successively so that the nut will be threaded onto the spindle, means for presenting a cutting tool to each nut after being threaded upon the spindle for the purpose of crowning a face of the said nut, and means for removing the nut from the threaded spindle while the spindle is rotating in the same direction and discharging the nut.

5. In a nut crowning machine, the combination of a head, means for indexing the said head, a plurality of rotating spindles carried by the head, a sliding head adapted to be reciprocated toward and from the first mentioned head, means mounted upon the sliding head for presenting a nut to a spindle upon each forward excursion of the head, a cutting tool carried by the sliding head and adapted to operate upon a nut previously threaded upon a spindle, and means carried by the sliding head operative upon the forward excursion thereof to engage a nut and remove the same from its carrying spindle.

6. In a nut crowning machine, the combination of a head, means for indexing said head, a plurality of spindles carried by the said head, means for continuously rotating said spindles, a stop mechanism adapted to retain the head in position after each indexing, a reciprocating head, means carried by said reciprocating head for feeding a nut upon the rotating spindle adjacent thereto, a plurality of cutting devices carried by the said reciprocating head and operative upon the forward excursion of the sliding head to simultaneously operate upon nuts carried by adjacent spindles, and rotating means carried by the sliding head, said rotating means turning in the same direction and with a greater speed than the spindles first mentioned, said rotating means engaging with the nut upon the spindle adjacent to the rotating means upon the forward excursion of the sliding head whereby the nut will be removed from the spindle.

7. In a nut crowning machine, the combination of a head, means for indexing said head, a plurality of rotating spindles carried by the said head, a sliding head adapted to be reciprocated toward and from the first mentioned head, means mounted upon the sliding head for presenting a nut to a spindle which is adjacent to the said means, a cutter carried by the said head for crowning a face of the nut, and means operative upon the forward excursion of the head adapted to engage the nut and release the same from the spindle, and means for causing the said spindle to partially release its hold upon the nut at the time the removing means is operative.

8. In a nut crowning machine, the combination of a head, means for indexing said head, a plurality of spindles mounted in the head, each of said spindles being provided with a threaded end portion, means for continuously rotating said spindles, a sliding head adapted to be reciprocated toward and from the first mentioned head, and means mounted upon said sliding head for feeding nut blanks upon the threaded ends of the spindles, a plurality of cutters carried by the said head and operating upon the forward excursion of the head to crown the faces of the nuts adjacent to the cutters, a rotating shaft mounted upon said sliding head, said shaft being provided with a head which engages with the nut opposite thereto upon the forward excursion of the sliding head, the said shaft being caused to turn in the same direction, but at a greater speed than the aforesaid spindles whereby the nut will be removed from the threaded spindle, and means for causing the nut to be partially released by the spindle at the time that the nut removing means is in operation.

9. In a nut crowning machine, the combination of a frame, a rotatable head carried by said frame, a plurality of spindles carried by said head, and means for rotating the said spindles, a reciprocating head, means carried by said head for successively feeding a nut upon the spindles, means for successively crowning the nuts, means for successively removing the nuts from the spindles and discharging the same, a shaft mounted in said frame, operative connections between the said shaft and the rotating head for causing the same to be indexed, and operative connections between the said shaft and the sliding head to cause the said head to be out of operative relation with the said rotating head while the said rotatable head is being indexed.

10. In a nut crowning machine, the combination of a frame, of a rotatable head carried in said frame, a plurality of rotating spindles mounted in said rotatable head, a reciprocating head mounted in the said frame, means mounted upon the said reciprocating head for successively feeding nuts upon the spindles, means for successively crowning a face of the nuts, means for successively removing the nuts from the spindles and discharging them, a shaft carried by the said frame, a plate carried by the said head provided with openings, an arm carried by the said shaft, provided with means to engage the said openings whereby the head will be indexed a quarter turn upon each complete engagement between the arm and the said plate, a cam carried by the said shaft, said cam being provided with a groove, a member projecting from the said sliding head into the groove in the same cam, said cam being arranged to reciprocate the slidable head toward and from the rotatable head at such times as the rotatable head is being indexed.

11. In a nut crowning machine, the combination of a frame, of a rotatable head mounted in said frame, a plate carried by said head provided with a series of indentations along the periphery thereof, a shaft mounted in the frame, an arm carried by said shaft, said arm being formed with two projections which successively engage adjacent indentations in the plate, each complete engagement between the arm and the plate during a single revolution of the shaft causing the said plate and head to turn through a predetermined portion of a revolution, a plurality of openings in the said head, a pin mounted in the frame and adapted to successively engage with the said openings in the head, a lever connected with said pin, a cam carried by the said shaft with which the lever coöperates for the purpose of operating the pin.

12. In a nut crowning machine, the combination of a rotating head of a plurality of spindles carried by said head, each of said spindles comprising a tubular casing, a rod extending through the said casing, a threaded stud operatively connected with the outer end of the rod adapted to receive a nut blank, a head carried by the casing through which the threaded stud projects and adapted to engage a nut blank to hold the same, and means for moving the rod forward with respect to the head to release the nut blank.

13. In a nut crowning machine, the combination of a rotatable head, of a plurality of spindles carried by said head, each spindle comprising a tubular casing, a rod extending through said tubular casing, a threaded stud operatively connected with the said rod, a head carried by the casing through which the stud projects, a pair of cam fingers pivotally carried by the said casing, a cross arm upon the rod against which the said fingers press, and means for operating the said fingers to cause the said rod to move with respect to the casing.

14. In a nut crowning machine, the combination of a rotating head, a plurality of spindles carried by said head, each spindle comprising a tubular casing, a rod extending through said tubular casing, a threaded stud carried by the said rod, a head mounted upon the casing through which the said stud projects, a cross member carried by the said rod near the rear portion thereof, a pair of cam fingers pivotally mounted upon the said tubular portion and bearing against a cross member carried by the rod, a spring-pressed sleeve upon the said tubular portion and adapted to engage the fingers before mentioned to operate the same and cause relative movements between the casing and the rod.

15. In a nut crowning machine, the combination of a rotating head, of a plurality of spindles mounted in said head, said spindles comprising a tubular member and a rod extending through said tubular member, and means for causing said rod to move with respect to the tubular member when each spindle reaches a predetermined position through the rotation of the head.

16. In a nut crowning machine, the combination of a frame, a rotating head carried by said frame, a plurality of spindles carried in said head, each spindle comprising a tubular casing, and a rod extending through the same, a sliding member carried by each spindle and adapted by its movement to cause the rod to move with respect to the casing in the spindle, and means upon the said frame for moving the said sliding member when each spindle is in a predetermined position.

17. In a nut crowning machine, the combination of a rotating spindle having a threaded end, of a receptacle for holding the nut blanks, an opening in said receptacle through which the nut blanks may pass, a reciprocating member normally closing the opening in the said nut holding receptacle, the reciprocating member and said spindle being in axial alinement, the forward end of said reciprocating member being provided with a nut receiving portion, a nut from said receptacle dropping into the nut receiving portion when the same is beneath the opening in the nut holding receptacle, the said reciprocating member in its forward excursion presenting the nut to the rotating spindle.

18. In a nut crowning machine, the combination of a continuously rotating spindle having a threaded end, of a nut hopper provided with a slot through which the nuts may pass, a reciprocating member in axial line with the rotating spindle, said reciprocating member being provided with means to engage with a nut, and being adapted to present a nut engaging portion beneath the nut hopper to receive a nut substantially at the end of its rearward excursion, said reciprocating member in its forward excursion closing the opening in the nut hopper and presenting the nut to the spindle.

19. In a nut crowning machine, the combination of a rotatable head, and a plurality of rotating spindles carried by said head, and means for indexing said head, of a reciprocating member which is in line with a spindle when the rotating head is stationary, a nut hopper provided with an opening through which the nuts may pass, said reciprocating member being provided with means for holding a nut and presenting the same to the rotating spindle which is adjacent when the reciprocating member is at the end of its forward excursion, said reciprocating member simultaneously closing the bottom of the hopper, the said rotatable head indexing during the rearward excursion of the reciprocating member, and the said reciprocating member simultaneously uncovering the opening within the hopper to receive a nut blank.

20. In a nut crowning machine, the combination of a frame, of a hopper supported from said frame, said hopper comprising a member having a slot into which the nuts are fed, a reciprocating member normally closing the lower end of said slot when at the end of its forward excursion, means carried by the said reciprocating member to receive a nut from said slot when the reciprocating member is at the end of its rear excursion, and a rotating spindle in axial alinement with the said reciprocating member to which the nuts are successively presented for engagement thereby.

21. In a nut crowning machine, the combination of a frame, of a nut hopper supported thereby, said nut hopper comprising a member provided with a slot into which the nuts are fed, a rod normally closing the lower end of said slot, said rod being provided at its forward end with means for supporting a nut and holding the same against rotation, means for reciprocating said rod, said rod at the end of its rear excursion being adapted to uncover the lower end of the slot in the hopper whereby a nut is discharged upon the nut holding means carried by the rod, a plurality of rotating spindles which successively come into axial alinement with the aforesaid rod, said rotating spindles successively receiving a nut at each forward reciprocation of the said rod.

22. In a nut crowning machine, the combination of a rotating spindle having a threaded end and a nut blank threaded on said end, of a member which is rotating in the same direction and at a greater speed than the spindle, the said rotating member being in alinement with the spindle, said rotatable member being provided with means to engage the nut, means for reciprocating said rotatable member whereby the said rotatable member will engage the nut upon the rotating spindle and remove the same therefrom.

23. In a nut crowning machine, the combination of the rotating spindle having a threaded end with a nut blank upon said threaded end, of a hollow rotatable shaft in alinement with the said spindle, said hollow shaft rotating in the same direction and at a greater speed than the spindle, means for reciprocating the said hollow shaft, means upon the hollow shaft for engaging the nut blank as the hollow shaft is at the end of its forward excursion, whereby the nut blank is removed from the spindle, the said nut blank passing through the hollow shaft and discharged at the opposite end thereof.

24. In a nut crowning machine, the combination of a plurality of rotating spindles each provided with a threaded end and having a nut blank screw threaded thereon, a hollow shaft, means for bringing the said spindle successively into line with the said hollow shaft, said hollow shaft being provided with a head adapted to engage with the nut blank upon an alined spindle at the end of its forward excursion, means for rotating said shaft in the same direction and at a greater speed than that at which the spindles are rotating, whereby the nut blank will be removed from the spindle, the nuts successively removed passing through the hollow shaft and being discharged at the outer end thereof.

25. In a nut crowning machine, the combination of a rotating spindle having a threaded end, and a nut blank threaded upon said end, of a shaft, a sliding head upon which said shaft is mounted, means for rotating said shaft in the same direction and at a greater speed than the spindle, a head carried by said rotating shaft, said head being formed to engage with the nut to remove the same from the threaded end of the spindle when the head is in engagement therewith.

26. In a nut crowning machine, the combination of a rotating spindle having a threaded end, and a nut blank threaded on said end, of a sliding base, a hollow shaft journaled upon said base, a head upon the said shaft having an internal shoulder, a tube extending through the said shaft and engaging with a shoulder upon the head, means for rotating said shaft in the same direction and at greater speed than the spindle, and means for reciprocating the said head.

27. In a nut crowning machine, the combination of a rotating spindle having a threaded end and a nut blank threaded on said end, of a sliding head, a hollow shaft journaled in said base and provided with a flange at one end thereof, a short tubular shaft provided with a flange engaging with a flange formed in the first shaft, a journal member mounted upon the said head in which the short shaft is mounted, a spring encircling the shaft and bearing at its opposite ends against the said journal and the flange on the shaft, a head upon the first tubular shaft provided with an internal shoulder, a tube extending through both of the hollow shafts and bearing against the shoulder upon the head, said head being formed to engage with the nut blank upon the threaded spindle, means for rotating the hollow shafts in the same direction and at a speed greater than the spindles, and means for reciprocating the sliding head toward and from the rotating spindle.

In testimony whereof, I hereunto affix my signature in the presence of two witnesses.

ROY H. SMITH.

Witnesses:
A. J. HUDSON,
H. R. SULLIVAN.

Copies of this patent may be obtained for five cents each, by addressing the "Commissioner of Patents, Washington, D. C."